(12) United States Patent
Nielsen et al.

(10) Patent No.: US 12,457,714 B2
(45) Date of Patent: Oct. 28, 2025

(54) FAN SPEED CONTROL FOR HIGH TONALITY AVOIDANCE

(71) Applicant: Microsoft Technology Licensing, LLC, Redmond, WA (US)

(72) Inventors: Gregory Allen Nielsen, Kirkland, WA (US); Benjamin Francis Walker, Vancouver (CA); Jani Samuli Kuivalainen, Duvall, WA (US); Sneha Rajeev Sondur, Seattle, WA (US); Ergo Esken, Miiduranna (EE)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 224 days.

(21) Appl. No.: 18/061,704

(22) Filed: Dec. 5, 2022

(65) Prior Publication Data

US 2024/0188257 A1  Jun. 6, 2024

(51) Int. Cl.
*H05K 7/20* (2006.01)
*G06F 1/20* (2006.01)

(52) U.S. Cl.
CPC ......... *H05K 7/20836* (2013.01); *G06F 1/206* (2013.01); *H05K 7/20209* (2013.01)

(58) Field of Classification Search
CPC ............... G06F 1/206; H05K 7/20736; H05K 7/20836; H05K 7/20209; F04D 27/001; F04D 27/004; F04D 29/582; F04D 29/661; F04D 29/663; F05D 2270/303; F05D 2270/313
USPC ........................................................ 700/300
See application file for complete search history.

(56) References Cited

U.S. PATENT DOCUMENTS

| 5,130,621 A | 7/1992 | Ohi |
| 5,428,965 A | 7/1995 | Grunwald |
| 6,601,168 B1 | 7/2003 | Stancil et al. |

(Continued)

FOREIGN PATENT DOCUMENTS

| EP | 2073195 A1 * | 6/2009 | ............. G01H 1/003 |
| TW | 201122234 A | 7/2011 | |
| TW | M411595 U | 9/2011 | |

OTHER PUBLICATIONS

"Tone Assessment using the 2260H Sound Level Analyzer", Retrieved from: https://www.bksv.com/media/doc/bo0499.pdf, Sep. 27, 2022, 32 Pages.

(Continued)

*Primary Examiner* — Chun Cao
(74) *Attorney, Agent, or Firm* — Weaver IP L.L.C.

(57) ABSTRACT

Systems and methods are described for reducing high tonality sounds by controlling the speed of a fan to avoid a range of fan speeds. A target speed of the fan is determined. When the target speed is in a lower portion of the range, a signal is transmitted to the fan to operate at a speed below the range. When the target speed is an upper portion of the range, a signal is transmitted to the fan to operate at a speed above the range. When the target speed transitions from the lower portion to the upper portion, or vice versa, a signal is transmitted to the fan to progressively transition between the speed below the range and the speed above the range, or vice versa. When the target speed is outside the range, a signal is transmitted to the fan to operate at the target speed.

20 Claims, 6 Drawing Sheets

(56) References Cited

U.S. PATENT DOCUMENTS

| | | | | |
|---|---|---|---|---|
| 7,779,960 | B2* | 8/2010 | Tang | H05K 7/20172 |
| | | | | 181/224 |
| 8,788,111 | B2* | 7/2014 | Uhlmann | G06F 1/206 |
| | | | | 700/304 |
| 10,083,683 | B2* | 9/2018 | Huo | G10K 11/178 |
| 10,888,021 | B2 | 1/2021 | Young et al. | |
| 2006/0034699 | A1* | 2/2006 | Flanigan | F04D 27/001 |
| | | | | 417/42 |
| 2009/0092261 | A1 | 4/2009 | Bard | |
| 2011/0199034 | A1 | 8/2011 | Wu | |
| 2012/0224322 | A1* | 9/2012 | Artman | H05K 7/20209 |
| | | | | 361/679.48 |
| 2013/0333871 | A1 | 12/2013 | Pimlott | |
| 2016/0043679 | A1 | 2/2016 | Shahi | |
| 2017/0009762 | A1 | 1/2017 | Lilie | |
| 2019/0008074 | A1 | 1/2019 | Chen | |
| 2024/0426320 | A1* | 12/2024 | Moeller | F04D 25/06 |

OTHER PUBLICATIONS

"Tone-to-Noise Ratio and Prominence Ratio", Retrieved from: https://community.sw.siemens.com/s/article/tone-to-noise-ratio-and-prominence-ratio, May 14, 2020, 23 Pages.

"Webinar: Rating Level, for Industrial and Environmental Noise Assessments", Retrieved from: https://www.youtube.com/watch?v=juBa2nSkPII&t=609s, Jul. 3, 2019, 2 Pages.

Heeger, David, "Perception Lecture Notes: Loudness Perception and Critical Bands", Retrieved from: https://web.archive.org/web/20130301001613/https://www.cns.nyu.edu/~david/courses/perception/lecturenotes/loudness/loudness.html, Mar. 1, 2013, pp. 1-5.

Lefebvre, et al., "SPLnFFT Noise Meter", Retrieved From: https://web.archive.org/web/20191208132932/https://apps.apple.com/us/app/splnfft-noise-meter/id355396114, Dec. 8, 2019, pp. 1-3.

International Search Report and Written Opinion received for PCT Application No. PCT/US2023/035561, Feb. 5, 2024, 16 pages.

International preliminary report on patentability received for PCT Application No. PCT/US2023/035561, Jun. 19, 2025, 10 pages.

* cited by examiner

FAN SPEED CONTROL FOR HIGH TONALITY AVOIDANCE

BACKGROUND

Fans are often used to cool electronic devices and thereby prevent such devices from overheating, including computers. In data centers, fans play a critical role in ensuring that servers do not overheat. Such fans may include but are not limited to fans that are installed within tower servers and rack servers and used to cool internal components thereof, chassis-mounted fans used to cool blade servers and other electronic components housed within a chassis, rack-mounted fans used to cool servers and other electronic components housed within a rack, and large fans used as part of data center air conditioning and air handling systems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems and methods are described herein for controlling the speed of fans to reduce the output of high tonality sounds. By controlling the speed of a fan to avoid these speed ranges, the output of sounds having high tonality characteristics can be reduced. In one aspect, a first range of fan speeds associated with high tonality is defined based on a first fan speed boundary value and a second fan speed boundary value. A first target fan speed is received. The first target fan speed is determined to be inside the first range. A first fan speed control signal is transmitted to the fan to maintain the speed of the fan at the first fan speed boundary value.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
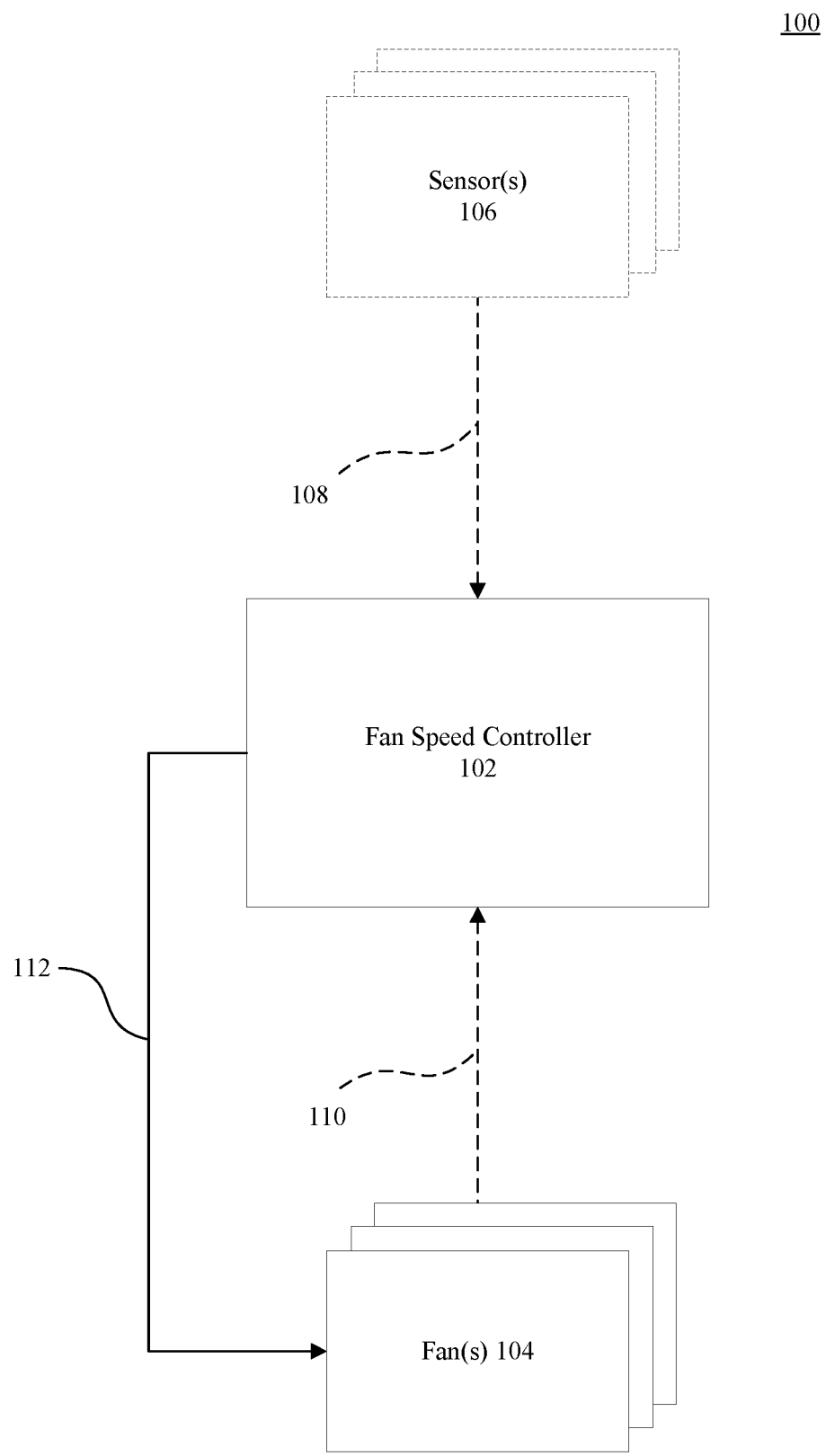
FIG. 1 shows a block diagram of an example system for controlling fan speed to avoid a high tonality range, according to an embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Fans are often used to cool electronic devices and thereby prevent such devices from overheating, including computers. User perceptible fan noise can be a challenge in computing devices and other devices with internal fans. Greater cooling from higher fan speeds can be used to maximize device performance, but on the other hand, the user may endure annoying fan noise under heavy system stress situations. In some conventional systems, a fan is configured to limit fan noise to a pre-determined sound pressure level (SPL), but even at the same SPL level the annoyance to the user can differ. A key "psychoacoustic" metric associated with user annoyance is a tonality, which is association of a high degree of fan noise with a particular fan speed. A highly tonal fan can be distracting and annoying to the user, even at the same SPL level, and detract from the user experience.

As such, at certain speed ranges, fans might emit sounds having high tonality characteristics. The output of such sounds is undesirable because sounds having high tonality characteristics are very perceptible to the human ear and can be distracting. According to embodiments disclosed herein, fan speed control is used to avoid undesirable fan speed ranges, thereby reducing fan noise having high tonality characteristics.

In one particular configuration, a device has a fan and the fan speed is set proportional to a target temperature, such as the system chassis temperature or CPU temperature. The system is dynamically configured to operate a fan to different fan profiles. Each fan profile defines when the fan starts, stops, a fan ramp rate, and max sound pressure levels (SPL). A particular fan profile is selected based on multiple inputs, such as operating system power settings, usage mode (e.g., gaming mode, etc.), ambient awareness, chassis temperature target exceedances, etc. Once the acoustic limit is reached, passive thermal management is implemented by throttling internal components. In some cases, a desired fan profile that normally would be set at, e.g., 30 dBA, would need to be set to some lower value, e.g., 27.4 dBA, to avoid a known high tone specification violating operating level. Additional throttling is required when the lower acoustic limit is reached. Such throttling of internal components is not always desirable.

The embodiments described herein are directed to techniques for reducing the output of high tonality fan noise by controlling the speed of the fan. By defining a range of fan speeds at which a fan emits sounds having high tonality characteristics, a fan speed controller can be configured to avoid this range of fan speeds. Any number of fan speed ranges may be defined corresponding to high tonality fan speeds. High tonality avoidance logic is described for modifying target fan speeds. A proportional-integral-derivative (PID) controller generates fan PWM control signals based on the modified target fan speeds to avoid the range.

For example, as the system heats up and target speed of the fan ramps up and crosses the lower boundary of the range, the high tonality avoidance logic causes the PID controller to transmit a fan control signal to the fan to operate at a fan speed just below the lower boundary of the range. The high tonality avoidance logic causes the PID controller to transmit a fan control signal to the fan to remain at the fan speed just below the lower boundary of the range until the target fan speed crosses a threshold fan speed value that is inside the range. When the target speed increases and crosses the threshold value, the high tonality avoidance logic causes the PID controller to transmit a fan control signal to the fan to transition the fan from a fan speed just below the lower boundary of the range to a fan speed just above the upper boundary of the range. While the target fan speed remains in the upper portion of the range, the high tonality avoidance logic causes the PID controller to transmit a fan control signal to the fan to operate at the fan speed just above the upper boundary of the range. When the target fan speed decreases and crosses a second threshold fan speed value, the high tonality avoidance logic causes the PID controller to transmit a fan control signal to the fan to transition from the fan speed just above the upper boundary of the range to the fan speed just below the lower boundary of the range.

In some embodiments, a state of hysteresis may occur when a single threshold is used for both the first threshold and the second threshold. For example, when an increase in temperature causes the target fan speed to cross the single threshold, the high tonality avoidance logic will cause PID controller to transition the fan speed from just below the lower boundary of the range to just above the upper boundary of the range. This transition increases the speed of the fan and lowers the temperature, resulting in a lowered target fan speed. This may cause the target fan speed to cross the single threshold again and cause the PID to transition the fan speed from just above the upper boundary of the range to just below the lower boundary of the range. These transitions across the range are highly noticeable to the user. As such, it is undesirable to transition the fan speed across the range repeatedly during a short period of time. To prevent the fan speed from transitioning repeatedly across the range in a short period of time, it may be desirable in some embodiments for the second threshold to be different than the first threshold. The second threshold value may be selected to avoid hysteresis. In other embodiments, the second threshold may be equal to the first threshold.

If at any point, the target fan speed exits the range, the high tonality avoidance logic causes the PID controller to transmit a fan control signal to the fan to operate at the target fan speed. In this way, a fan operates in the high tonality range only during transitions from one boundary of the range to the other boundary of the range. This substantially reduces the amount of time during which the fan emits sounds having high tonality characteristics.

The speed of a fan is controlled by a fan controller transmitting a signal to set the fan at a target fan speed. The target fan speed may be determined based on input information. In some embodiments the input information may include sensor information, such as types of sensor information mentioned elsewhere herein or otherwise known.

In some embodiments the input information may also include fan mode profiles, such as but not limited to, a system throttling mode, a gaming mode, a movie mode, a sports mode, a music mode, a videoconference mode, a teleconference mode, a voice-over-IP (VOIP) mode, a streaming mode, and/or any other mode related to the activity of a user, a system and/or application. The different fan mode profiles correlate the input information to different target fan speeds. For example, temperature information may correlate to a higher target fan speed in a gaming mode (e.g., 6000 RPM (rotations per minute)) and a lower capped fan speed in a VoIP mode (e.g., 3000 RPM). The fan mode profiles may be selected based on the input information. For example, a gaming mode may be selected if input information indicates that the user is currently playing a game.

In some embodiments the fan mode profiles may also consider user preferences. For example, a user interface may be provided to allow a user to customize or tune the fan mode profiles and/or create new fan mode profiles. Alternatively, a system may automatically and/or dynamically adjust fan mode profiles based on feedback from the user (e.g., adjusting the volume).

Embodiments may be configured in various ways in various environments. For instance, FIG. 1 show a block diagram of system 100 for controlling the speed of a fan to avoid a range of speeds at which the fan emits sounds having high tonality characteristics. System 100 includes a fan speed controller 102 and one or more fans 104. In some embodiments system 100 may also include one or more sensors 106. System 100 may be implemented in a single system (i.e., in a single device housing), such as in a client computer or in a server. Alternatively, one or more components of System 100 may be implemented separately. For example, fan(s) 104 and/or sensor(s) 106 may be external to or remote from fan speed controller 102. Each of these components may be implemented in hardware (e.g., using one or more digital and/or analog circuits), as software (e.g., software or firmware executed by one or more microprocessors or microcontrollers), or as a combination of hardware and software.

System 100 may be implemented in various environments. For example, system 100 may be implemented on a client, such as but not limited to, a personal computer, a laptop computer, a tablet computer or the like. In such an environment, fan(s) 104 may act as cooling fans to control the temperature of the client system. This may include controlling the temperature of the outer skin or chassis of the client or controlling the temperature of the processor(s) of the client. In other embodiments, system 100 may be implemented as part of a server environment. For example, system 100 may used to control cooling fans in a server room. Furthermore, system 100 may be used to control any type of cooling fan, including but not limited to, those found in refrigeration, HVAC fans and/or air circulation.

In system 100, fan speed controller 102 receives sensor information 108 from sensor(s) 106. Fan speed controller 102 is configured to adapt a speed of one or more of fan(s) based on sensor information 108 and upon further information. In an embodiment, fan speed controller 102 is configured to monitor temperature data provided by sensor(s) 106 associated with another component of system 100 (not depicted), obtained from one or more temperature sensors of sensor(s) 106, and to activate or deactivate fan(s) 104 and/or drive fan(s) 104 to a desired fan speed based on such temperature data. Sensor information 108 may include one or more of temperature information, current fan speed information, chassis temperature information, processor temperature information, ambient temperature information, ambient noise information, operating system state information, display state information, microphone state information, speaker state information, input/output (I/O) state information, power state information, application state information, and/or application type information.

Fan speed controller 102 may be configured to control the speed of fan(s) 104 in various ways when each fan is activated, such as by, for example, varying a duty cycle of a PWM signal 112 that is provided to each fan (e.g., via a wire). Controlling the speed of a fan by varying the duty cycle of the PWM signal provides benefits over controlling the speed of the fan by varying the voltage, including improved energy efficiency, lower noise, lower vibration and prolonged fan life. Fan(s) 104 may include one or more fans of any suitable type. In one embodiment, a fan of fan(s) 104 with variable speed control may comprise a 4-wire fan. In accordance with such an embodiment, a first wire connected to the 4-wire fan is used to provide a constant voltage supply thereto, a second wire connected to the 4-wire fan is connected to ground, a third wire connected to the 4-wire fan is used to provide a pulse width modulated (PWM) signal thereto, the duty cycle of which determines the fan speed, and a fourth wire connected to the 4-wire fan outputs a signal from a tachometer included within the fan that can be used to measure fan speed, and this signal may be received by fan speed controller 102 as a current fan speed. However, this is merely one example and persons skilled in the relevant art will appreciate that any of a wide variety of different fan types may be included.

Figure 2:
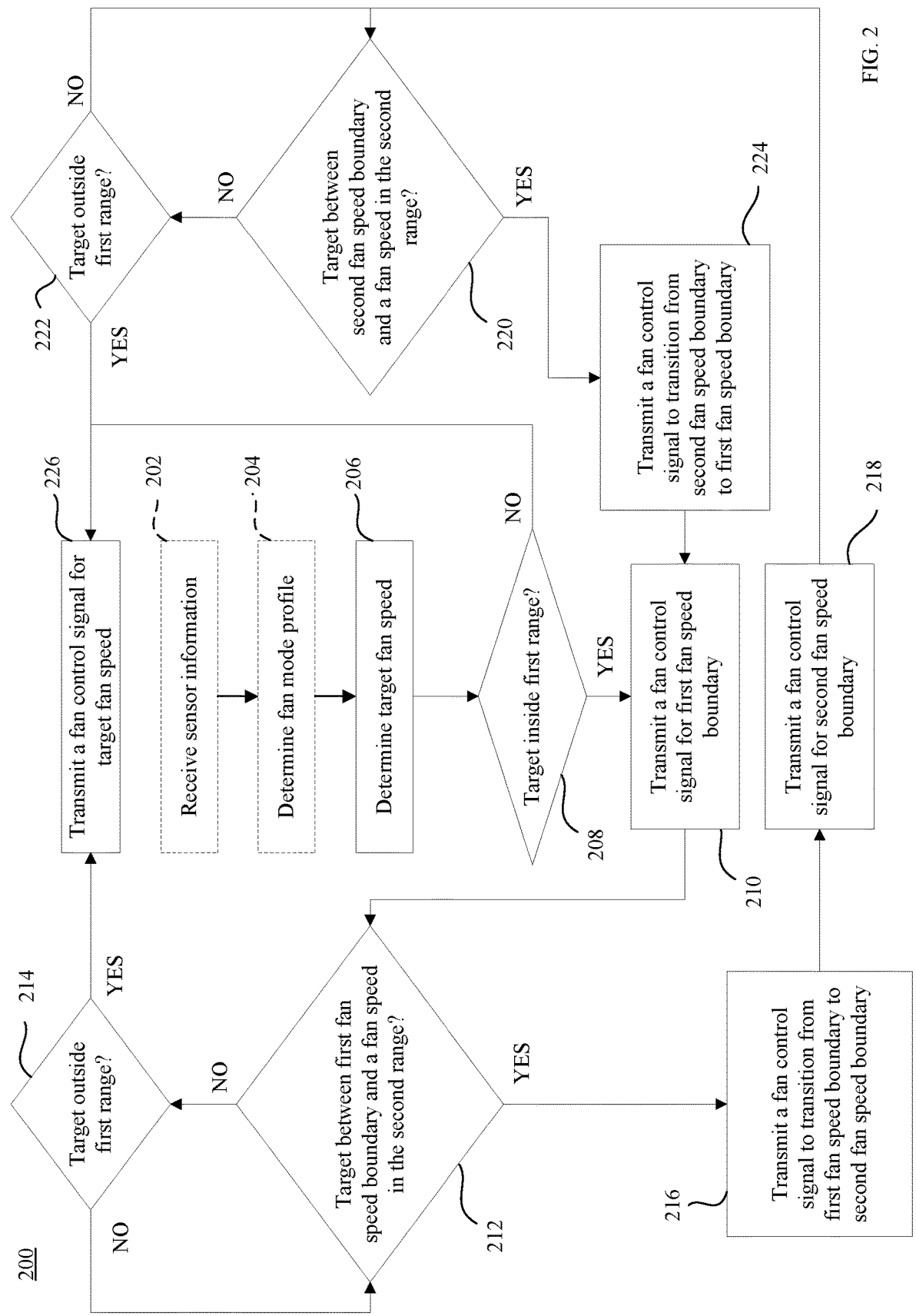
FIG. 2 depicts a flowchart of an example method for controlling fan speed to avoid a high tonality range, according to an embodiment.

Note that fan speed controller 102 may be configured in various ways and may operate as described above and in various further ways to control speed of fan(s) 104 to avoid excessive tonality. For instance, FIG. 2 depicts a flowchart 200 of a method for controlling the speed of a fan to avoid a range of RPMs at which the fan emits sounds having high tonality characteristics, according to an embodiment. Furthermore, FIG. 3. shows a block diagram of a system 300 for fan tonality avoidance, according to an example embodiment. System 300 is an example of system 100. Similarly to system 100 of FIG. 1, system 300 includes a fan speed controller 102, fan(s) 104 and, in some embodiments, sensor(s) 106. Fan speed controller 102 of system 300 further includes a target fan speed selector 302, high tonality avoidance logic 304, and a proportional-integral-derivative (PID) controller 310. Optionally, fan speed controller 102 may further include one or more fan mode profiles 312 and/or one or more fan speed sensors 314. In an embodiment flowchart 200 may be implemented by fan speed controller 102 of FIGS. 1 and 3. Accordingly, flowchart 200 will be described with reference to FIGS. 1 and 3. Other structural and operational embodiments will be apparent to persons skilled in the relevant art(s) based on the following discussion regarding flowchart 200 and system(s) 100 and 300.

Figure 3:
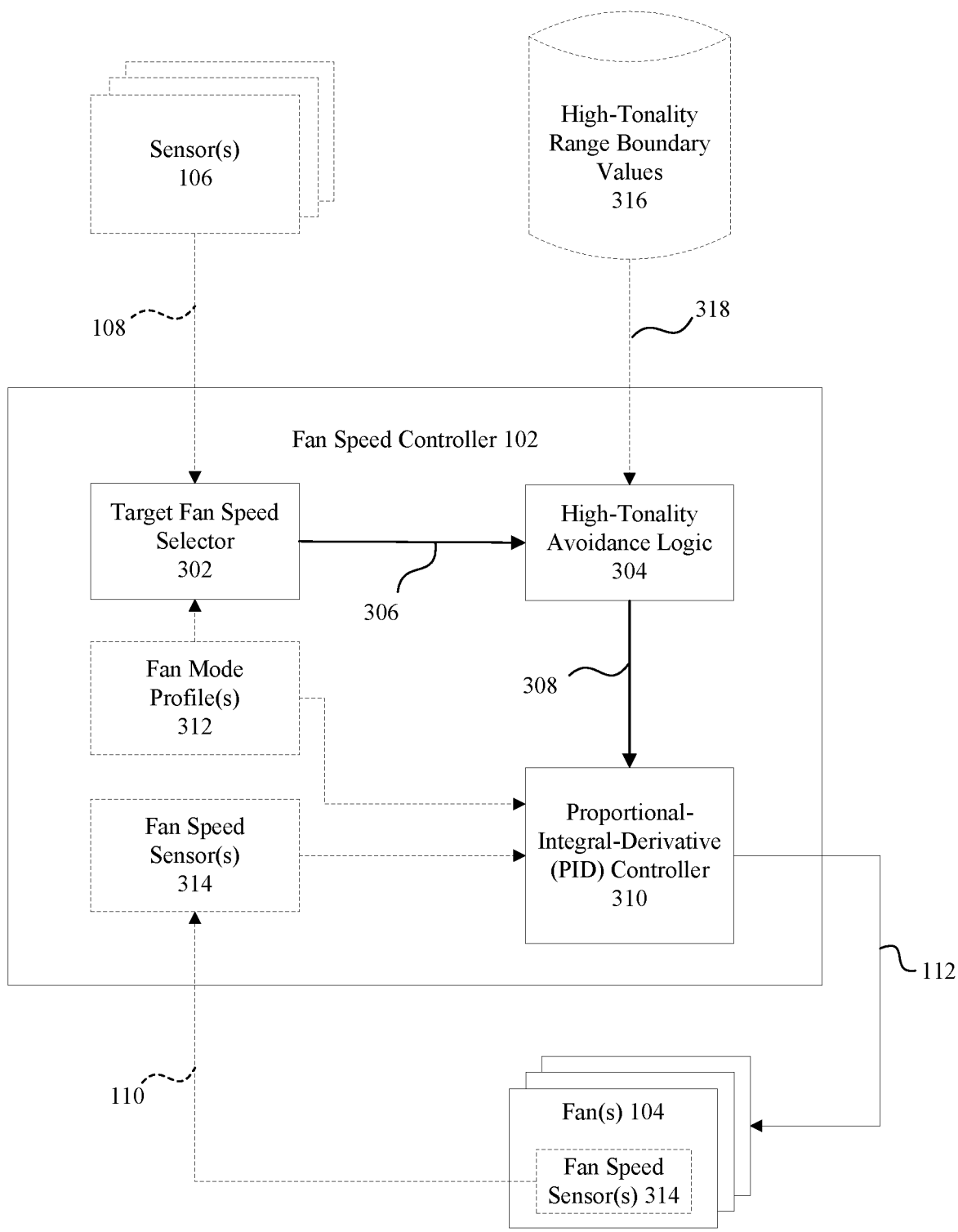
FIG. 3 shows a block diagram of an example system for controlling fan speed to avoid a high tonality range, according to an embodiment.

As depicted in FIG. 3, fan speed sensor(s) 314 may reside inside fan(s) 104. In some embodiments, fan speed sensor(s) 314 may provide sensor data including, but not limited to, optical or magnetic sensor data suitable for calculating fan speed, data from a tachometer, data from an anemometer or other sensor that is suitable for measuring airflow proximal to a fan, data representative of an amount of power consumed by a fan, or the like.

Furthermore, system 300 may optionally include storage storing high tonality range boundary values 316. Examples of physical storage for storing high tonality range boundary values 316 are described elsewhere herein. While the high tonality range boundary values 316 are depicted as being stored external to fan speed controller 102, they may also be incorporated into fan speed controller 102, for example, as part of a configuration file or the like. For example, the high tonality range boundary values 316 may be pre-determined and encoded into the high tonality avoidance logic 304. In other embodiments, the high tonality range boundary values 316 may be included in and provided from fan mode profile(s) 312.

PID controller 310 is configured to transition the fan from the current fan speed to the target fan speed. In embodiments, PID 310 controller receives as input the current speed of the fan and the target speed of the fan. Based on the input and a set of proportional, integral, and derivative parameter values, the fan progressively transitions the fan from the current fan speed to the target fan speed. The values of the proportional, integral, and derivative parameters determine the rate at which the fan transitions from the current fan speed to the target fan speed. Transitioning the fan from the current fan speed to the target fan speed too quickly creates a sudden change in the fan speed and the noise generated by the fan. Such a sudden change is highly perceptible to the user. As such, it is desirable to transition the speed of the fan from the current fan speed to the target fan speed progressively, such that the transition is less noticeable to the user.

PID 310 controller generates fan control signal 112 based on the current speed of the fan, the target fan speed, and the set of proportional, integral, and derivative parameter values, and transmits the fan control signal to the fan. As the speed of the fan changes, the current speed of the fan is determined and provided as feedback to the PID controller. Based on the feedback, the PID controller generates a new fan control signal based on the new current speed of the fan, the target fan speed, and the set of proportional, integral, and derivative parameter values, and transmits the new signal to the fan. This process continues until the output fan control signal from PID controller settles at the target fan speed. In some embodiments, the output fan control signal from the PID controller may cause the speed of the fan to overshoot the target fan speed before settling at the target fan speed due to a lag in the feedback information.

The operating characteristics of the PID controller may be changed by changing the proportional, integral, and derivative parameter values. For example, the rate at which the fan transitions from a current fan speed to the target fan speed may be altered by a designer by providing different values for the proportional, integral, and derivative parameters. The values of the proportional, integral, and derivative parameters may be determined as part of the design process to produce desired operating characteristics of the fan. In some embodiments, the proportional, integral, and derivative parameter values may be pre-determined. In other embodiments, the proportional, integral, and derivative parameter values may be updated, for example, through software and/or firmware. In some embodiments, the proportional, integral, and derivative parameter values may vary based on the fan mode profiles. In some embodiments, the proportional, integral, and derivative parameter values may be updated manually, automatically and/or dynamically, such as by the user and/or the system and/or based on, for example, sensor information.

Returning to FIG. 2, flowchart 200 starts at step 202, where sensor information is received. For example, target speed fan selector 302 may receive sensor information 108 from sensor(s) 106. Examples of sensor information 108 are described elsewhere herein.

At step 204, a fan mode profile is optionally determined. For example, target fan speed selector 302 may use one or more fan mode profile(s) 312 to determine the target fan speed 306 based on the sensor information 108. Examples of physical storage for storing fan mode profile(s) 312 are described elsewhere herein. The fan mode profile(s) 312 may include a default fan mode profile and/or one or more specialized fan mode profiles. Each fan mode profile may include various parameters, including one or more target fan speed settings, desired rates for increase and/or decrease of fan rate speed, and/or further fan speed tuning parameters. The fan mode profile may be selected and/or provided based on the sensor information. For example, a fan mode profile associated with high ambient noise environments may be selected based on ambient noise information provided by a microphone. Alternatively, the fan mode profile(s) 312 may be selected based on system state information. For example, a videoconferencing fan mode profile may be selected when the system state information indicates that the user is participating in a videoconference.

At step 206, a target fan speed is determined. For example, target fan speed selector 302 may select a target fan speed based on the sensor information 108 from the sensor(s) 106, a current fan speed 110, the fan mode profile(s) 312, and/or additional input information. Target fan speed selector 302 may determine the target fan speed using various techniques, such as but not limited to, using a function, a mapping table, and the like.

At step 208, it is determined whether the target fan speed is within a first range. For example, high tonality avoidance logic 304 determines whether the target fan speed is within a first range by comparing the high tonality boundary values 316 to the target fan speed 306 received from the target fan speed selector 302. The first range may be indicated in a fan profile (when used) or otherwise. The first range indicates upper and lower boundary fan speeds that contain one or more high tonality fan speeds within. As such, in embodiments, it is desired to avoid targeting a fan speed for a fan within the first range, and thus fan speed controller 102 is configured to avoid fan speeds in the first region by operating according to flowchart 200 (or as otherwise described herein). If the target fan speed is within the first range, the flowchart proceeds to step 210. If the target fan speed is not within the first range, the flowchart proceeds to step 226, where a fan control signal is transmitted to the fan to operate at the target fan speed. For example, the high tonality avoidance logic 304 may pass the target fan speed 306 unchanged to PID controller 310. PID controller 310 may then generate and transmit a fan control signal 112 to transition the speed of the fan from the current fan speed to the target fan speed.

At step 210, a fan control signal is transmitted for a first fan speed boundary value. For example, high tonality avoidance logic 304 transmits the first fan speed boundary value as a modified target fan speed 308 to PID controller 310, which in turn generates and transmits a fan speed control signal 112 to the fan(s) 104. Fan speed control signal 112 may include a PWM signal, as described above. The first fan speed boundary value may be either the lower boundary value or the upper boundary value of the range of fan speeds at which the fan emits sounds having high tonality characteristics.

PID controller 310 generates fan control signal 112 based on the current speed of the fan 110, the modified target fan speed 308, and a set of proportional, integral, and derivative parameter values, and transmits the fan control signal 112 to the fan(s) 104. As the speed of the fan changes, one or more fan speed sensors 314 provide an updated current fan speed 110 as feedback to the PID controller 310. While FIG. 3 depicts fan sensor(s) 314 located inside both the fan speed controller 102 and the fan(s) 104, in some embodiments, the fan speed sensor(s) 314 may be implemented in a single location. Alternatively, the fan speed sensor(s) 314 may be implemented separately from both the fan speed controller 102 and the fan(s) 104 or omitted completely from system 300. Based on the feedback from the fan speed sensor(s) 314, the PID controller 310 generates a new fan control signal 112 based on the updated current speed of the fan 110, the modified target fan speed 308, and the set of proportional, integral, and derivative parameter values, and transmits the new fan control signal 112 to the fan(s) 104. This process continues until the output fan control signal 112 from PID controller 310 settles at the target fan speed 308. In some embodiments, the output fan control signal 112 from the PID controller 310 may cause the speed of the fan to overshoot the modified target fan speed 308 before settling at the modified target fan speed 308 due to a lag in the feedback information.

At step 212, it is determined whether the target fan speed is between the first fan speed boundary value and a value in the second range. For example, high tonality avoidance logic 304 may determine whether the target fan speed 306 is between the first fan speed boundary value and the value in the second range. If the target fan speed 306 is not between the first fan speed boundary value and the value in the second range, the flowchart proceeds to step 214. If the target fan speed 306 is between the first fan speed boundary value and the value in the second range, the flowchart proceeds to step 216.

At step 214, it is determined whether the target fan speed is outside the first range. For example, high tonality avoidance logic 304 may determine whether the target fan speed 306 is outside the first range. In flowchart 200, steps 212 and 214 loop repeatedly until either the conditional of step 212 or the conditional of step 214 is determined to be true. In some embodiments, steps 212 and 214 may be performed in a different order, in parallel, and/or simultaneously. At step 214, if the target fan speed 306 is outside the first range, the flowchart proceeds to step 226, where a fan control signal is transmitted to the fan to operate at the target fan speed. For example, the high tonality avoidance logic 304 may pass the target fan speed 306 unchanged to PID controller 310. The PID controller 310 may then generate and transmit a fan control signal 112 to transition the speed of the fan from the current fan speed to the target fan speed. At step 214, if the fan speed 306 is not outside the first range, the flowchart returns to step 212.

At step 216, a fan control signal is transmitted to transition the fan from the first fan speed boundary value to the second fan speed boundary value. For example, in response to determining that the target fan speed 306 is between the first fan speed boundary value and the value in the second range, high tonality avoidance logic 304 transmits the second fan speed boundary value as a modified target fan speed 308 to PID controller 310. Transitioning the fan from the first fan speed boundary value to the second fan speed boundary value quickly reduces the amount of time in the first range and the amount of time during which the fan emits sounds having high tonality characteristics. However, transitioning the fan from the first fan speed boundary value to the second fan speed boundary too quickly may create a sudden change in the fan speed and the noise generated by the fan. Such a sudden change is highly perceptible to the user. As such, in some embodiments, the speed of the fan is transitioned from the first fan speed boundary value to the second fan speed boundary progressively, such that the transition is less noticeable to the user.

The PID controller 310 generates a fan control signal based on the current speed of the fan 110, the modified target fan speed 308, and a set of proportional, integral, and derivative parameter values, and transmits the fan control signal 112 to the fan(s) 104. As the speed of the fan changes, one or more fan speed sensors 314 provide an updated current fan speed 110 as feedback to the PID controller 310. While FIG. 3 depicts fan sensor(s) 314 located inside both the fan speed controller 102 and the fan(s) 104, in some embodiments, the fan speed sensor(s) 314 may be implemented in a single location. Alternatively, the fan speed sensor(s) 314 may be implemented separately from both the fan speed controller 102 and the fan(s) 104 or omitted completely from system 300. Based on the feedback from the fan speed sensor(s) 314, the PID controller 310 generates a new fan control signal 112 based on the updated current speed of the fan 110, the modified target fan speed 308, and the set of proportional, integral, and derivative parameter values, and transmits the new fan control signal 112 to the fan(s) 104. This process continues until the output fan control signal 112 from PID controller 310 settles at the modified target fan speed 308. In some embodiments, the output fan control signal 112 from the PID controller 310 may cause the speed of the fan to overshoot the modified target fan speed 308 before settling at the modified target fan speed 308 due to a lag in the feedback information.

At step 218, a fan speed control signal is transmitted for the second fan speed boundary value. For example, when the current speed of the fan 110 settles at the modified target fan speed 308, PID controller 310 may continue to transmit a fan control signal 112 to maintain the speed of the fan at the second fan speed boundary value.

At step 220, it is determined whether the target fan speed is between the second fan speed boundary value and a fan speed in the second range. For example, high tonality avoidance logic 304 may determine whether the target fan speed 306 is between the second fan speed boundary value and the value in the second range. As will be discussed in further detail in conjunction with FIG. 4, the fan speed value in the second range in step 220 may be the same or may be different from the fan speed value in the second range in step 212. If the target fan speed 306 is not between the second fan speed boundary value and the value in the second range, the flowchart proceeds to step 222. If the target fan speed 306 is between the first fan speed boundary value and the value in the second range, the flowchart proceeds to step 224.

At step 222, it is determined whether the target fan speed is outside the first range. For example, high tonality avoidance logic 304 may determine whether the target fan speed 306 is outside the first range. In flowchart 200, steps 220 and 222 loop repeatedly until either the conditional of step 220 or the conditional of step 222 is determined to be true. In some embodiments, steps 220 and 222 may be performed in a different order, in parallel, and/or simultaneously. At step 222, if the target fan speed 306 is outside the first range, the flowchart proceeds to step 226, where a fan control signal is transmitted to the fan to operate at the target fan speed. For example, the high tonality avoidance logic 304 may pass the target fan speed 306 unchanged to PID controller 310. The PID controller 310 may then generate and transmit a fan control signal 112 to transition the speed of the fan from the current fan speed to the target fan speed. At step 222, if the fan speed 306 is not outside the first range, the flowchart returns to step 220.

At step 224, a fan control signal is transmitted to transition the fan from the second fan speed boundary value to the first fan speed boundary value. For example, in response to determining that the target fan speed 306 is between the second fan speed boundary value and the value in the second range, high tonality avoidance logic 304 transmits the first fan speed boundary value as a modified target fan speed 308 to PID controller 310. After the speed of the fan settles at the first fan speed boundary value, flowchart 200 returns to step 210 where the PID controller may continue to transmit a fan control signal 112 to maintain the speed of the fan at the first fan speed boundary value. As mentioned elsewhere herein, transitioning the fan from the second fan speed boundary value to the first fan speed boundary value quickly reduces the amount of time in the first range and the amount of time during which the fan emits sounds having high tonality characteristics, though a quick transition may create a sudden change in the fan speed and the noise generated by the fan that is highly perceptible to the user. As such, in some embodiments, the speed of the fan is transitioned from the second fan speed boundary value to the first fan speed boundary progressively, such that the transition is less noticeable.

Figure 4:
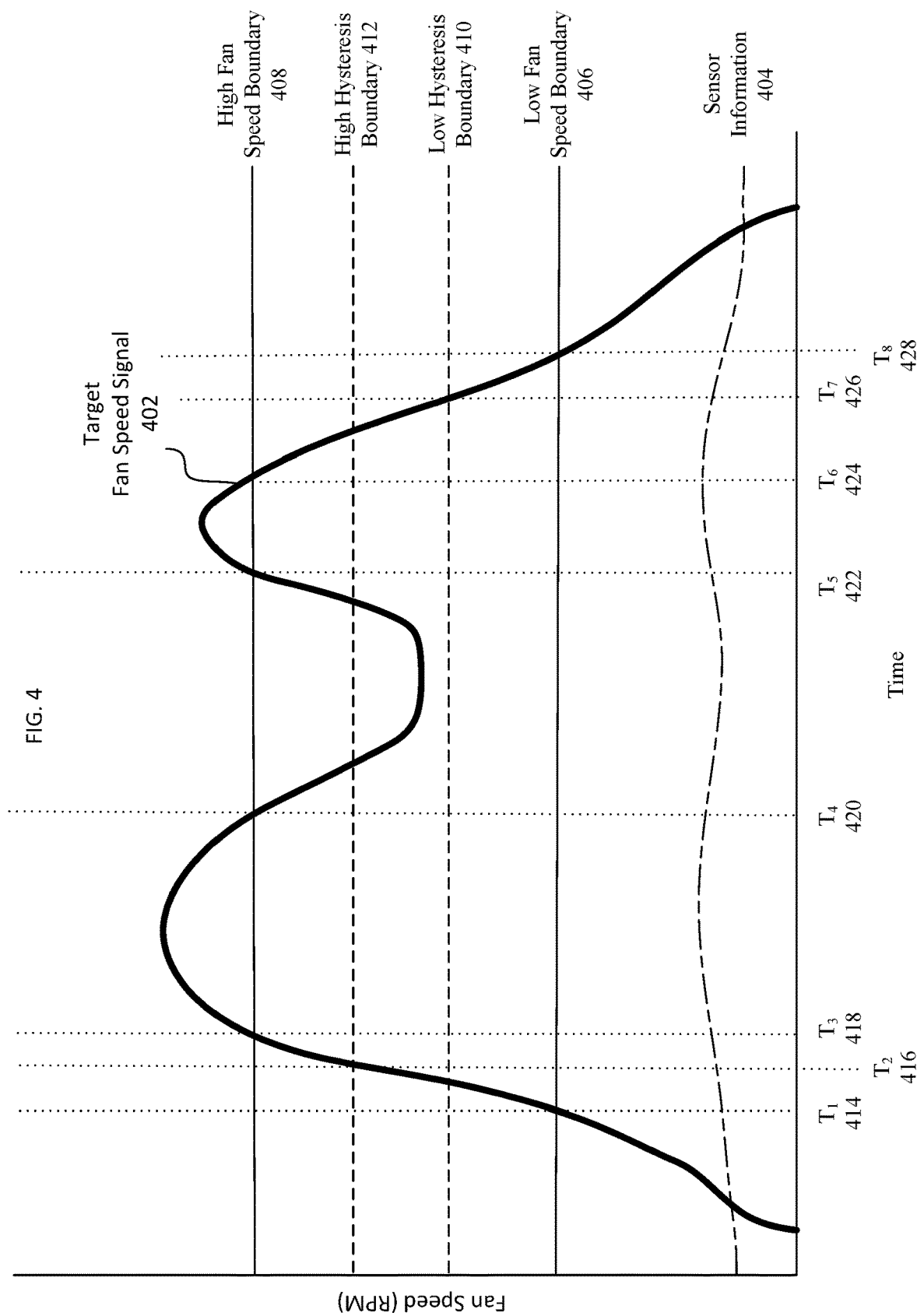
FIG. 4 depicts a graph showing an example operation of a fan operating without high tonality avoidance logic, according to an embodiment.
Figure 5:
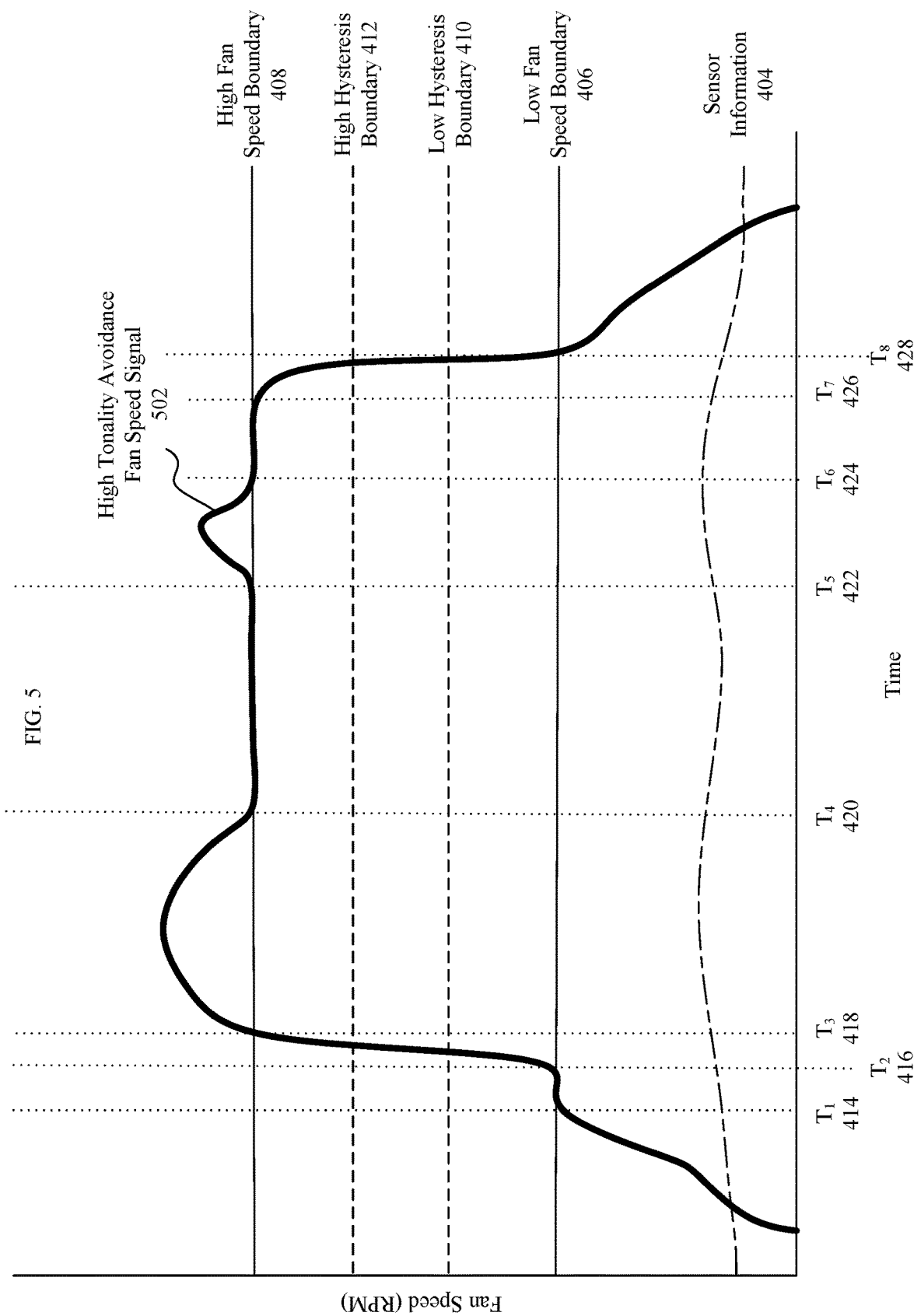
FIG. 5 depicts a graph showing an example operation of a fan operating with high tonality avoidance logic, according to an embodiment.

As mentioned, embodiments enable avoidance of high tonality fan speeds by diverting fan speed out of an undesired high tonality fan speed range. An example of such avoidance is graphically depicted with respect to FIGS. 4 and 5. In particular, FIG. 4 depicts a graph 400 showing an exemplary operation of a fan based on sensor information 404 without high tonality avoidance. FIG. 5 depicts a graph 500 showing an exemplary operation of the same fan based on the same sensor information 404 with high tonality avoidance, according to an embodiment. FIGS. 4 and 5 each depict a single exemplary instance of the operation of a fan and are not intended to limit the disclosed embodiments to the instances depicted.

In graph 400, the first range is depicted as the range bounded by the low fan speed boundary 406 and the high fan speed boundary 408. Inside the first range is a smaller second range bounded by the low hysteresis range boundary 410 and the high hysteresis boundary 412. To avoid hysteresis, the threshold at which the high tonality avoidance logic 304 causes PID 310 to transmit a signal 112 to transition the speed of fan(s) 104 from the low fan speed boundary 406 to the high fan speed boundary 408 may be a higher than the threshold at which the high tonality avoidance logic 304 causes PID 310 to transmit a signal 112 to transition the speed of fan(s) 104 from the high fan speed boundary 408 to the low fan speed boundary 406. For example, the threshold to at which the high tonality avoidance logic 304 causes PID 310 to transmit a signal 112 to transition the speed of fan(s) 104 from the low fan speed boundary 406 to the high fan speed boundary 408 may be set at the high hysteresis boundary 412 and the threshold at which the high tonality avoidance logic 304 causes PID 310 to transmit a signal 112 to transition the speed of fan(s) 104 from the high fan speed boundary 408 to the low fan speed boundary 406 may be set at the low hysteresis boundary 410. In some embodiments, the threshold at which the high tonality avoidance logic 304 causes PID 310 to transmit a signal 112 to transition the speed of fan(s) 104 from the low fan speed boundary 406 to the high fan speed boundary 408 and the threshold at which the high tonality avoidance logic 304 causes PID 310 to transmit a signal 112 to transition the speed of fan(s) 104 from the high fan speed boundary 408 to the low fan speed boundary 406 may be include any value within the second range. In other embodiments, there may be no second range and the threshold at which the high tonality avoidance logic 304 causes PID 310 to transmit a signal 112 to transition the speed of fan(s) 104 from the low fan speed boundary 406 to the high fan speed boundary 408 and the threshold at which the high tonality avoidance logic 304 causes PID 310 to transmit a signal 112 to transition the speed of fan(s) 104 from the high fan speed boundary 408 to the low fan speed boundary 406 may be the same threshold value. Furthermore, FIGS. 4 and 5 are merely exemplary and the size and position of the second range the second range relative to the first range may differ from what is depicted in the figures.

Graph 400 shows an exemplary operation of a fan based on sensor information 404 without high tonality avoidance logic 304. In graph 400, the target fan speed signal 402 changes in response to changes in the sensor information 404. For example, the sensor information 404 may include temperature information. The target fan speed signal 402 remains at zero until the temperature exceeds a particular threshold at which point the target fan speed signal 402 increases to activate the fan. The target fan speed signal 402 continues to rise and fall throughout the first and second ranges in response to changes in the temperature.

FIG. 5 depicts graph 500 showing the operation of the same fan based on the same sensor information 404 with high tonality avoidance logic 304. Like graph 400 of FIG. 4, the high tonality avoidance fan speed signal 502 changes in response to changes in the sensor information 404. Before time $T_1$ 414, while the target fan speed signal is below the first range, the high tonality avoidance fan speed signal 502 is the same as target fan speed signal 402. Between times $T_1$ 414 and $T_2$ 416, when the target fan speed signal 402 remains in the region between the low fan speed boundary 406 and the high hysteresis boundary 412, the high tonality avoidance fan speed signal 502 remains at the low fan speed boundary 406. At time $T_2$ 416, when the target fan speed signal 402 passes the high hysteresis boundary 412, the high tonality avoidance fan speed signal 502 transitions from the low fan speed boundary 406 to the high fan speed boundary 408. The rate at which the fan speed transitions from the low fan speed boundary 406 to the high fan speed boundary 408 may be controlled by the PID controller 310, as described above. Between times $T_3$ 418 and $T_4$ 420, when the target fan speed signal 402 is above the first range, the high tonality avoidance fan speed signal 502 is the same as target fan speed signal 402. Between times $T_4$ 420 and $T_5$ 422, when the target fan speed signal 402 is between the high fan speed boundary 408 and the low hysteresis boundary 410, the high tonality avoidance fan speed signal 502 remains at the high fan speed boundary 408. Between times $T_5$ 422 and $T_6$ 424, when the target fan speed signal 402 is above the first range, the high tonality avoidance fan speed signal 502 is the same as target fan speed signal 402. Between times $T_6$ 424 and $T_7$ 426, when the target fan speed signal 402 is between the high fan speed boundary 408 and the low hysteresis boundary 410, the high tonality avoidance fan speed signal 502 remains at the high fan speed boundary 408. At time $T_7$ 426, when the target fan speed signal 402 passes the low hysteresis boundary 410, the high tonality avoidance fan speed signal 502 transitions from the high fan speed boundary 408 to the low fan speed boundary 406. The rate at which the fan speed transitions from the high fan speed boundary 408 to the low fan speed boundary 406 may be controlled by the PID controller 310, as described above. Finally, after time $T_8$, when the target fan speed signal 402 is below the first range, the high tonality avoidance fan speed signal 502 is the same as target fan speed signal 402.

III. Example Mobile Device and Computer System Implementation

The systems and methods described above in reference to FIGS. 1-5, including Fan Speed Controller 102, Sensor(s) 106, Target Fan Speed Selector 302, High-Tonality Avoidance Logic 304, Proportional-Integral-Derivative (PID) Controller 310, Fan Mode Profile(s) 312, Fan Speed Sensor (s) 314 and/or each of the components described therein, and the steps of flowchart 200 may be implemented in hardware, or hardware combined with one or both of software and/or firmware. For example Fan Speed Controller 102. Sensor(s) 106, Target Fan Speed Selector 302, High-Tonality Avoidance Logic 304, Proportional-Integral-Derivative (PID) Controller 308, Fan Mode Profile(s) 312 and/or each of the components described therein, and the steps of flowchart 200 may be each implemented as computer program code/ instructions configured to be executed in one or more processors and stored in a computer readable storage medium. Alternatively, Fan Speed Controller 102, Sensor(s) 106, Target Fan Speed Selector 302, High-Tonality Avoidance Logic 304, Proportional-Integral-Derivative (PID) Controller 310, Fan Mode Profile(s) 312. Fan Speed Sensor (s) 314 and/or each of the components described therein, and the steps of flowchart 200 may be each implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 6:
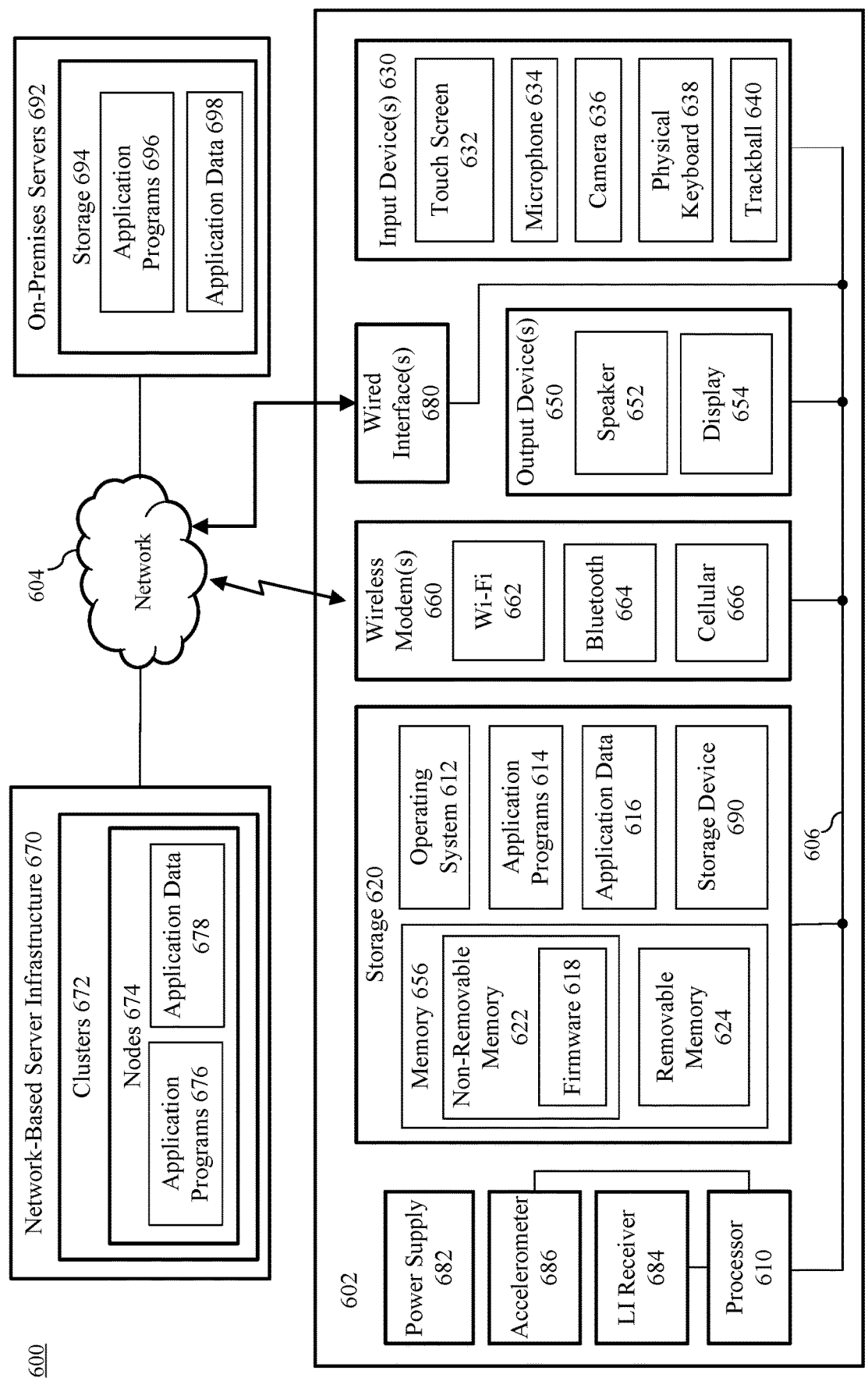
FIG. 6 shows a block diagram of an example computer system in which embodiments may be implemented.

Embodiments disclosed herein may be implemented in one or more computing devices that may be mobile (a mobile device) and/or stationary (a stationary device) and may include any combination of the features of such mobile and stationary computing devices. Examples of computing devices, such as system 100 of FIG. 1, in which embodiments may be implemented are described as follows with respect to FIG. 6. FIG. 6 shows a block diagram of an exemplary computing environment 600 that includes a computing device 602. In some embodiments, computing device 602 is communicatively coupled with devices (not shown in FIG. 6) external to computing environment 600 via network 604. Network 604 comprises one or more networks such as local area networks (LANs), wide area networks (WANs), enterprise networks, the Internet, etc., and may include one or more wired and/or wireless portions. Network 604 may additionally or alternatively include a cellular network for cellular communications. Computing device 602 is described in detail as follows Computing device 602 can be any of a variety of types of computing devices. For example, computing device 602 may be a mobile computing device such as a handheld computer (e.g., a personal digital assistant (PDA)), a laptop computer, a tablet computer (such as an Apple iPad™), a hybrid device, a notebook computer (e.g., a Google Chromebook™ by Google LLC), a netbook, a mobile phone (e.g., a cell phone, a smart phone such as an Apple® iPhone® by Apple Inc., a phone implementing the Google® Android™ operating system, etc.), a wearable computing device (e.g., a head-mounted augmented reality and/or virtual reality device including smart glasses such as Google® Glass™, Oculus Rift® of Facebook Technologies, LLC, etc.), or other type of mobile computing device. Computing device 602 may alternatively be a stationary computing device such as a desktop computer, a personal computer (PC), a stationary server device, a minicomputer, a mainframe, a supercomputer, etc.

As shown in FIG. 6, computing device 602 includes a variety of hardware and software components, including a processor 610, a storage 620, one or more input devices 630, one or more output devices 650, one or more wireless modems 660, one or more wired interfaces 680, a power supply 682, a location information (LI) receiver 684, and an accelerometer 686. Storage 620 includes memory 656, which includes non-removable memory 622 and removable memory 624, and a storage device 690. Storage 620 also stores an operating system 612, application programs 614, and application data 616. Wireless modem(s) 660 include a Wi-Fi modem 662, a Bluetooth modem 664, and a cellular modem 666. Output device(s) 650 includes a speaker 652 and a display 654. Input device(s) 630 includes a touch screen 632, a microphone 634, a camera 636, a physical keyboard 638, and a trackball 640. Not all components of computing device 602 shown in FIG. 6 are present in all embodiments, additional components not shown may be present, and any combination of the components may be present in a particular embodiment. These components of computing device 602 are described as follows.

A single processor 610 (e.g., central processing unit (CPU), microcontroller, a microprocessor, signal processor, ASIC (application specific integrated circuit), and/or other physical hardware processor circuit) or multiple processors 610 may be present in computing device 602 for performing such tasks as program execution, signal coding, data processing, input/output processing, power control, and/or other functions. Processor 610 may be a single-core or multi-core processor, and each processor core may be single-threaded or multithreaded (to provide multiple threads of execution concurrently). Processor 610 is configured to execute program code stored in a computer readable medium, such as program code of operating system 612 and application programs 614 stored in storage 620. Operating system 612 controls the allocation and usage of the components of computing device 602 and provides support for one or more application programs 614 (also referred to as "applications" or "apps"). Application programs 614 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Any component in computing device 602 can communicate with any other component according to function, although not all connections are shown for ease of illustration. For instance, as shown in FIG. 6, bus 606 is a multiple signal line communication medium (e.g., conductive traces in silicon, metal traces along a motherboard, wires, etc.) that may be present to communicatively couple processor 610 to various other components of computing device 602, although in other embodiments, an alternative bus, further buses, and/or one or more individual signal lines may be present to communicatively couple components. Bus 606 represents one or more of any of several types of bus structures, including a memory bus or memory controller, a peripheral bus, an accelerated graphics port, and a processor or local bus using any of a variety of bus architectures.

Storage 620 is physical storage that includes one or both of memory 656 and storage device 690, which store operating system 612, application programs 614, and application data 616 according to any distribution. Non-removable memory 622 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 622 may include main memory and may be separate from or fabricated in a same integrated circuit as processor 610. As shown in FIG. 6, non-removable memory 622 stores firmware 618, which may be present to provide low-level control of hardware. Examples of firmware 618 include BIOS (Basic Input/Output System, such as on personal computers) and boot firmware (e.g., on smart phones). Removable memory 624 may be inserted into a receptacle of or otherwise coupled to computing device 602 and can be removed by a user from computing device 602. Removable memory 624 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 690 may be present that are internal and/or external to a housing of computing device 602 and may or may not be removable. Examples of storage device 690 include a hard disk drive, a SSD, a thumb drive (e.g., a USB (Universal Serial Bus) flash drive), or other physical storage device.

One or more programs may be stored in storage 620. Such programs include operating system 612, one or more application programs 614, and other program modules and program data. Examples of such application programs may include, for example, computer program logic (e.g., computer program code/instructions) for implementing one or more of Fan Speed Controller 102, Sensor(s) 106, Target Fan Speed Selector 302, High-Tonality Avoidance Logic 304, Proportional-Integral-Derivative (PID) Controller 310, Fan Mode Profile(s) 312, Fan Speed Sensor(s) 314 and/or each of the components described therein, along with any components and/or subcomponents thereof, as well as the flowcharts/flow diagrams (e.g., flowchart 200) described herein, including portions thereof, and/or further examples described herein.

Storage 620 also stores data used and/or generated by operating system 612 and application programs 614 as application data 616. Examples of application data 616 include web pages, text, images, tables, sound files, video data, and other data, which may also be sent to and/or received from one or more network servers or other devices via one or more wired or wireless networks. Storage 620 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 602 through one or more input devices 630 and may receive information from computing device 602 through one or more output devices 650. Input device(s) 630 may include one or more of touch screen 632, microphone 634, camera 636, physical keyboard 638 and/or trackball 640 and output device(s) 650 may include one or more of speaker 652 and display 654. Each of input device(s) 630 and output device(s) 650 may be integral to computing device 602 (e.g., built into a housing of computing device 602) or external to computing device 602 (e.g., communicatively coupled wired or wirelessly to computing device 602 via wired interface(s) 680 and/or wireless modem(s) 660). Further input devices 630 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 654 may display information, as well as operating as touch screen 632 by receiving user commands and/or other information (e.g., by touch, finger gestures, virtual keyboard, etc.) as a user interface. Any number of each type of input device(s) 630 and output device(s) 650 may be present, including multiple microphones 634, multiple cameras 636, multiple speakers 652, and/or multiple displays 654.

One or more wireless modems 660 can be coupled to antenna(s) (not shown) of computing device 602 and can support two-way communications between processor 610 and devices external to computing device 602 through network 604, as would be understood to persons skilled in the relevant art(s). Wireless modem 660 is shown generically and can include a cellular modem 666 for communicating with one or more cellular networks, such as a GSM network for data and voice communications within a single cellular network, between cellular networks, or between the mobile device and a public switched telephone network (PSTN). Wireless modem 660 may also or alternatively include other radio-based modem types, such as a Bluetooth modem 664 (also referred to as a "Bluetooth device") and/or Wi-Fi 662 modem (also referred to as an "wireless adaptor"). Wi-Fi modem 662 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 664 is configured to communicate with another Bluetooth-capable device according to the Bluetooth short-range wireless technology standard(s) such as IEEE 802.15.1 and/or managed by the Bluetooth Special Interest Group (SIG).

Computing device 602 can further include power supply 682, LI receiver 684, accelerometer 686, and/or one or more wired interfaces 680. Example wired interfaces 680 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, an Ethernet port, and/or an Apple® Lightning® port, the purposes and functions of each of which are well known to persons skilled in the relevant art(s). Wired interface(s) 680 of computing device 602 provide for wired connections between computing device 602 and network 604, or between computing device 602 and one or more devices/peripherals when such devices/peripherals are external to computing device 602 (e.g., a pointing device, display 654, speaker 652, camera 636, physical keyboard 638, etc.). Power supply 682 is configured to supply power to each of the components of computing device 602 and may receive power from a battery internal to computing device 602, and/or from a power cord plugged into a power port of computing device 602 (e.g., a USB port, an A/C power port). LI receiver 684 may be used for location determination of computing device 602 and may include a satellite navigation receiver such as a Global Positioning System (GPS) receiver or may include other type of location determiner configured to determine location of computing device 602 based on received information (e.g., using cell tower triangulation, etc.). Accelerometer 686 may be present to determine an orientation of computing device 602.

Note that the illustrated components of computing device 602 are not required or all-inclusive, and fewer or greater numbers of components may be present as would be recognized by one skilled in the art. For example, computing device 602 may also include one or more of a gyroscope, barometer, proximity sensor, ambient light sensor, digital compass, etc. Processor 610 and memory 656 may be co-located in a same semiconductor device package, such as being included together in an integrated circuit chip, FPGA, or system-on-chip (SOC), optionally along with further components of computing device 602.

In embodiments, computing device 602 is configured to implement any of the above-described features of flowcharts herein. Computer program logic for performing any of the operations, steps, and/or functions described herein may be stored in storage 620 and executed by processor 610.

In some embodiments, server infrastructure 670 may be present in computing environment 600 and may be communicatively coupled with computing device 602 via network 604. Server infrastructure 670, when present, may be a network-accessible server set (e.g., a cloud-based environment or platform). As shown in FIG. 6, server infrastructure 670 includes clusters 672. Each of clusters 672 may comprise a group of one or more compute nodes and/or a group of one or more storage nodes. For example, as shown in FIG. 6, cluster 672 includes nodes 674. Each of nodes 674 are accessible via network 604 (e.g., in a "cloud-based" embodiment) to build, deploy, and manage applications and services. Any of nodes 674 may be a storage node that comprises a plurality of physical storage disks, SSDs, and/or other physical storage devices that are accessible via network 604 and are configured to store data associated with the applications and services managed by nodes 674. For example, as shown in FIG. 6, nodes 674 may store application data 678.

Each of nodes 674 may, as a compute node, comprise one or more server computers, server systems, and/or computing devices. For instance, a node 674 may include one or more of the components of computing device 602 disclosed herein. Each of nodes 674 may be configured to execute one or more software applications (or "applications") and/or services and/or manage hardware resources (e.g., processors, memory, etc.), which may be utilized by users (e.g., customers) of the network-accessible server set. For example, as shown in FIG. 6, nodes 674 may operate application programs 676. In an implementation, a node of nodes 674 may operate or comprise one or more virtual machines, with each virtual machine emulating a system architecture (e.g., an operating system), in an isolated manner, upon which applications such as application programs 676 may be executed.

In an embodiment, one or more of clusters 672 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 672 may be a datacenter in a distributed collection of datacenters. In embodiments, exemplary computing environment 600 comprises part of a cloud-based platform such as Amazon Web Services® of Amazon Web Services, Inc. or Google Cloud Platform™ of Google LLC, although these are only examples and are not intended to be limiting.

In an embodiment, computing device 602 may access application programs 676 for execution in any manner, such as by a client application and/or a browser at computing device 602. Example browsers include Microsoft Edge® by Microsoft Corp. of Redmond, Washington, Mozilla Firefox®, by Mozilla Corp. of Mountain View, California, Safari®, by Apple Inc. of Cupertino, California, and Google® Chrome by Google LLC of Mountain View, California.

For purposes of network (e.g., cloud) backup and data security, computing device 602 may additionally and/or alternatively synchronize copies of application programs 614 and/or application data 616 to be stored at network-based server infrastructure 670 as application programs 676 and/or application data 678. For instance, operating system 612 and/or application programs 614 may include a file hosting service client, such as Microsoft® OneDrive® by Microsoft Corporation, Amazon Simple Storage Service (Amazon S3)® by Amazon Web Services, Inc., Dropbox® by Dropbox, Inc., Google Drive™ by Google LLC, etc., configured to synchronize applications and/or data stored in storage 620 at network-based server infrastructure 670.

In some embodiments, on-premises servers 692 may be present in computing environment 600 and may be communicatively coupled with computing device 602 via network 604. On-premises servers 692, when present, are hosted within an organization's infrastructure and, in many cases, physically onsite of a facility of that organization. On-premises servers 692 are controlled, administered, and maintained by IT (Information Technology) personnel of the organization or an IT partner to the organization. Application data 698 may be shared by on-premises servers 692 between computing devices of the organization, including computing device 602 (when part of an organization) through a local network of the organization, and/or through further networks accessible to the organization (including the Internet). Furthermore, on-premises servers 692 may serve applications such as application programs 696 to the computing devices of the organization, including computing device 602. Accordingly, on-premises servers 692 may include storage 694 (which includes one or more physical storage devices such as storage disks and/or SSDs) for storage of application programs 696 and application data 698 and may include one or more processors for execution of application programs 696. Still further, computing device 602 may be configured to synchronize copies of application programs 614 and/or application data 616 for backup storage at on-premises servers 692 as application programs 696 and/or application data 698.

Embodiments described herein may be implemented in one or more of computing device 602, network-based server infrastructure 670, and on-premises servers 692. For example, in some embodiments, computing device 602 may be used to implement systems, clients, or devices, or components/subcomponents thereof, disclosed elsewhere herein. In other embodiments, a combination of computing device 602, network-based server infrastructure 670, and/or on-premises servers 692 may be used to implement the systems, clients, or devices, or components/subcomponents thereof, disclosed elsewhere herein.

As used herein, the terms "computer program medium," "computer-readable medium," and "computer-readable storage medium," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 620. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 614) may be stored in storage 620. Such computer programs may also be received via wired interface(s) 680 and/or wireless modem(s) 660 over network 604. Such computer programs, when executed or loaded by an application, enable computing device 602 to implement features of embodiments discussed herein. Accordingly, such computer programs represent controllers of the computing device 602.

Embodiments are also directed to computer program products comprising computer code or instructions stored on any computer-readable medium or computer-readable storage medium. Such computer program products include the physical storage of storage 620 as well as further physical storage types.

IV. Additional Example Embodiments

In an embodiment, a method for controlling the speed of a fan includes: defining a first range of fan speeds associated with high tonality based on a first fan speed boundary value and a second fan speed boundary value; determining a first target fan speed; determining that the first target fan speed is inside the first range; and transmitting a first fan speed control signal to the fan to maintain the speed of the fan at the first fan speed boundary value.

In an embodiment, the method further includes: defining a second range of fan speeds based on a third fan speed boundary value and a fourth fan speed boundary value, the third and fourth fan speed boundary values within the first range and selected to avoid hysteresis; determining a second target fan speed; determining that the second target fan speed is between the second fan speed boundary value and a fan speed value in the second range; and transmitting a second fan speed control signal to the fan to transition the speed of the fan from the first fan speed boundary value to the second fan speed boundary value.

In an embodiment, the method further includes: determining a third target fan speed; determining that the third target fan speed is between the first fan speed boundary value and a fan speed value in the second range; and transmitting a third fan speed control signal to the fan to transition the speed of the fan from the second fan speed boundary value to the first fan speed boundary value.

In an embodiment, the transmitting the second fan speed control signal comprises: receiving, at a proportional-integral-derivative (PID) controller, a current speed of the fan and the second fan speed boundary value; generating, by the PID controller, a pulse-width modulation (PWM) signal based on the current speed, the second fan speed boundary value, and a set of proportional, integral, and derivative parameter values; and transmitting, to the fan, the PWM signal to control speed of the fan, wherein the PWM signal transitions the speed of the fan from the first fan speed boundary value to the second fan speed boundary value progressively over a period of time.

In an embodiment, the proportional, integral, and derivative parameter values are determined from fan mode profiles.

In an embodiment, the first fan speed boundary value is the highest fan speed value of the first range, the second fan speed boundary value is the lowest fan speed of the first range, the third fan speed boundary value is the highest fan speed value of the second range, and the fourth fan speed boundary value is the lowest fan speed value of the second range.

In an embodiment, the first fan speed boundary value is the lowest fan speed value of the first range, the second fan speed boundary value is the highest fan speed of the first range, the third fan speed boundary value is the lowest fan speed value of the second range, and the fourth fan speed boundary value is the highest fan speed value of the second range.

In another embodiment, a system for controlling the speed of a fan comprises: a fan; a sensor; and a fan speed controller configured to: define a first range of fan speeds associated with high tonality based on a first fan speed boundary value and a second fan speed boundary value; define a second range of fan speeds based on a third fan speed boundary value and a fourth fan speed boundary value, the third and fourth fan speed boundary values within the first range and selected to avoid hysteresis; determine a first target fan speed; determine that the first target fan speed is inside the first range; transmit a first fan speed control signal to the fan to maintain the speed of the fan at the first fan speed boundary value; determine a second target fan speed; determine that the second target fan speed is between the second fan speed boundary value and a fan speed value in the second range; and transmit a second fan speed control signal to the fan to transition the speed of the fan from the first fan speed boundary value to the second fan speed boundary value.

In an embodiment, the fan speed controller is further configured to: determine a third target fan speed; determine that the third target fan speed is between the first fan speed boundary value and a fan speed value in the second range; and transmit a third fan speed control signal to the fan to transition the speed of the fan from the second fan speed boundary value to the first fan speed boundary value.

In an embodiment, the system further comprises: a proportional-integral-derivative (PID) controller, wherein the fan speed controller is further configured to: receive, at the PID controller, a current speed of the fan and the second fan speed boundary value; generate, by the PID controller, a pulse-width modulation (PWM) signal based on the current speed, the second fan speed boundary value, and a set of proportional, integral, and derivative parameter values; and transmit, to the fan, the PWM signal to control speed of the fan, wherein the PWM signal transitions the speed of the fan from the first fan speed boundary value to the second fan speed boundary value progressively over a period of time.

In an embodiment, the proportional, integral, and derivative parameter values of the PID controller are determined from one or more fan mode profiles.

In an embodiment, the fan speed controller is further configured to: receive sensor information from the sensor; and select a fan mode profile from the one or more fan mode profiles based on the sensor information, wherein the sensor information comprises temperature information, ambient noise information, application state information, display state information, or system state information.

In an embodiment, the first fan speed boundary value is the highest fan speed value of the first range, the second fan speed boundary value is the lowest fan speed of the first range, the third fan speed boundary value is the highest fan speed value of the second range, and the fourth fan speed boundary value is the lowest fan speed value of the second range.

In an embodiment, the first fan speed boundary value is the lowest fan speed value of the first range, the second fan speed boundary value is the highest fan speed of the first range, the third fan speed boundary value is the lowest fan speed value of the second range, and the fourth fan speed boundary value is the highest fan speed value of the second range.

In another embodiment, a computer-readable storage medium has computer-executable instructions stored thereon that, when executed by a processor, causes a speed fan controller to: define a first range of fan speeds associated with high tonality based on a first fan speed boundary value and a second fan speed boundary value; define a second range of fan speeds based on a third fan speed boundary value and a fourth fan speed boundary value, the third and fourth fan speed boundary values within the first range and selected to avoid hysteresis; determine a first target fan speed; determine that the first target fan speed is inside the first range; transmit a first fan speed control signal to the fan to maintain the speed of the fan at the first fan speed boundary value; determine a second target fan speed; determine that the second target fan speed is between the second fan speed boundary value and a fan speed value in the second range; and transmit a second fan speed control signal to the fan to transition the speed of the fan from the first fan speed boundary value to the second fan speed boundary value.

In an embodiment, the computer-executable instructions, when executed by the processor, further cause a fan speed controller to: determine a third target fan speed; determine that the third target fan speed is between the first fan speed boundary value and a fan speed value in the second range; and transmit a third fan speed control signal to the fan to transition the speed of the fan from the second fan speed boundary value to the first fan speed boundary value.

In an embodiment, the computer-executable instructions, when executed by the processor, further cause a fan speed controller to: receive, at a proportional-integral-derivative (PID) controller, a current speed of the fan and the second fan speed boundary value; generate, by the PID controller, a pulse-width modulation (PWM) signal based on the current speed, the second fan speed boundary value, and a set of proportional, integral, and derivative parameter values; and transmit, to the fan, the PWM signal to control speed of the fan, wherein the PWM signal transitions the speed of the fan from the first fan speed boundary value to the second fan speed boundary value progressively over a period of time.

In an embodiment, the proportional, integral, and derivative parameter values of the PID controller are determined from fan mode profiles.

In an embodiment, the first fan speed boundary value is the highest fan speed value of the first range, the second fan speed boundary value is the lowest fan speed of the first range, the third fan speed boundary value is the highest fan speed value of the second range, and the fourth fan speed boundary value is the lowest fan speed value of the second range.

In an embodiment, the first fan speed boundary value is the lowest fan speed value of the first range, the second fan speed boundary value is the highest fan speed of the first range, the third fan speed boundary value is the lowest fan speed value of the second range, and the fourth fan speed boundary value is the highest fan speed value of the second range.

V. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Furthermore, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

While various embodiments of the present disclosure have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed:

1. A method for controlling a speed of a fan, the method comprising:
    defining a first range of fan speeds associated with high tonality based on a first fan speed boundary value and a second fan speed boundary value;
    defining a second range of fan speeds based on a third fan speed boundary value and a fourth fan speed boundary value, the third and fourth fan speed boundary values within the first range;
    determining a first target fan speed;
    determining that the first target fan speed is inside the first range;
    transmitting a first fan speed control signal to the fan to maintain the speed of the fan at the first fan speed boundary value;
    determining a second target fan speed;
    determining that the second target fan speed is between the second fan speed boundary value and a fan speed value in the second range; and
    transmitting a second fan speed control signal to the fan to transition the speed of the fan from the first fan speed boundary value to the second fan speed boundary value.

2. The method of claim 1, the third and fourth fan speed boundary values are selected to avoid hysteresis.

3. The method of claim 1, further comprising:
    determining a third target fan speed;
    determining that the third target fan speed is between the first fan speed boundary value and a fan speed value in the second range; and
    transmitting a third fan speed control signal to the fan to transition the speed of the fan from the second fan speed boundary value to the first fan speed boundary value.

4. The method of claim 1, wherein transmitting the second fan speed control signal comprises:
    receiving, at a proportional-integral-derivative (PID) controller, a current speed of the fan and the second fan speed boundary value;
    generating, by the PID controller, a pulse-width modulation (PWM) signal based on the current speed, the second fan speed boundary value, and a set of proportional, integral, and derivative parameter values; and
    transmitting, to the fan, the PWM signal to control speed of the fan,
    wherein the PWM signal transitions the speed of the fan from the first fan speed boundary value to the second fan speed boundary value progressively over a period of time.

5. The method of claim 4, wherein the proportional, integral, and derivative parameter values are determined from fan mode profiles.

6. The method of claim 1, wherein the first fan speed boundary value is the highest fan speed value of the first range, the second fan speed boundary value is the lowest fan speed of the first range, the third fan speed boundary value is the highest fan speed value of the second range, and the fourth fan speed boundary value is the lowest fan speed value of the second range.

7. The method of claim 1, wherein the first fan speed boundary value is the lowest fan speed value of the first range, the second fan speed boundary value is the highest fan speed of the first range, the third fan speed boundary value is the lowest fan speed value of the second range, and the fourth fan speed boundary value is the highest fan speed value of the second range.

8. A system for controlling a speed of a fan, comprising:
a fan;
a sensor; and
a fan speed controller configured to:
  define a first range of fan speeds associated with high tonality based on a first fan speed boundary value and a second fan speed boundary value;
  define a second range of fan speeds based on a third fan speed boundary value and a fourth fan speed boundary value, the third and fourth fan speed boundary values within the first range and selected to avoid hysteresis;
  determine a first target fan speed;
  determine that the first target fan speed is inside the first range;
  transmit a first fan speed control signal to the fan to maintain the speed of the fan at the first fan speed boundary value;
  determine a second target fan speed;
  determine that the second target fan speed is between the second fan speed boundary value and a fan speed value in the second range; and
  transmit a second fan speed control signal to the fan to transition the speed of the fan from the first fan speed boundary value to the second fan speed boundary value.

9. The system of claim 8, wherein the fan speed controller is further configured to:
determine a third target fan speed;
determine that the third target fan speed is between the first fan speed boundary value and a fan speed value in the second range; and
transmit a third fan speed control signal to the fan to transition the speed of the fan from the second fan speed boundary value to the first fan speed boundary value.

10. The system of claim 8, further comprising:
a proportional-integral-derivative (PID) controller,
wherein the fan speed controller is further configured to:
  receive, at the PID controller, a current speed of the fan and the second fan speed boundary value;
  generate, by the PID controller, a pulse-width modulation (PWM) signal based on the current speed, the second fan speed boundary value, and a set of proportional, integral, and derivative parameter values; and
  transmit, to the fan, the PWM signal to control speed of the fan,
  wherein the PWM signal transitions the speed of the fan from the first fan speed boundary value to the second fan speed boundary value progressively over a period of time.

11. The system of claim 10, wherein the proportional, integral, and derivative parameter values of the PID controller are determined from one or more fan mode profiles.

12. The system of claim 11, wherein the fan speed controller is further configured to:
receive sensor information from the sensor; and
select a fan mode profile from the one or more fan mode profiles based on the sensor information,
wherein the sensor information comprises temperature information, ambient noise information, application state information, display state information, or system state information.

13. The system of claim 8, wherein the first fan speed boundary value is the highest fan speed value of the first range, the second fan speed boundary value is the lowest fan speed of the first range, the third fan speed boundary value is the highest fan speed value of the second range, and the fourth fan speed boundary value is the lowest fan speed value of the second range.

14. The system of claim 8, wherein the first fan speed boundary value is the lowest fan speed value of the first range, the second fan speed boundary value is the highest fan speed of the first range, the third fan speed boundary value is the lowest fan speed value of the second range, and the fourth fan speed boundary value is the highest fan speed value of the second range.

15. A computer-readable storage medium having computer-executable instructions stored thereon that, when executed by a processor, causes a speed fan controller to:
define a first range of fan speeds associated with high tonality based on a first fan speed boundary value and a second fan speed boundary value;
define a second range of fan speeds based on a third fan speed boundary value and a fourth fan speed boundary value, the third and fourth fan speed boundary values within the first range and selected to avoid hysteresis;
determine a first target fan speed;
determine that the first target fan speed is inside the first range;
transmit a first fan speed control signal to the fan to maintain the speed of the fan at the first fan speed boundary value;
determine a second target fan speed;
determine that the second target fan speed is between the second fan speed boundary value and a fan speed value in the second range; and
transmit a second fan speed control signal to the fan to transition the speed of the fan from the first fan speed boundary value to the second fan speed boundary value.

16. The computer-readable storage medium of claim 15, wherein the computer-executable instructions, when executed by the processor, further cause a fan speed controller to:
determine a third target fan speed;
determine that the third target fan speed is between the first fan speed boundary value and a fan speed value in the second range; and
transmit a third fan speed control signal to the fan to transition the speed of the fan from the second fan speed boundary value to the first fan speed boundary value.

17. The computer-readable storage medium of claim 15, wherein the computer-executable instructions, when executed by the processor, further cause a fan speed controller to:
receive, at a proportional-integral-derivative (PID) controller, a current speed of the fan and the second fan speed boundary value;
generate, by the PID controller, a pulse-width modulation (PWM) signal based on the current speed, the second fan speed boundary value, and a set of proportional, integral, and derivative parameter values; and
transmit, to the fan, the PWM signal to control speed of the fan,
wherein the PWM signal transitions the speed of the fan from the first fan speed boundary value to the second fan speed boundary value progressively over a period of time.

18. The computer-readable storage medium of claim 17, wherein the proportional, integral, and derivative parameter values of the PID controller are determined from fan mode profiles.

19. The computer-readable storage medium of claim 15, wherein the first fan speed boundary value is the highest fan speed value of the first range, the second fan speed boundary value is the lowest fan speed of the first range, the third fan speed boundary value is the highest fan speed value of the second range, and the fourth fan speed boundary value is the lowest fan speed value of the second range.

20. The computer-readable storage medium of claim 15, wherein the first fan speed boundary value is the lowest fan speed value of the first range, the second fan speed boundary value is the highest fan speed of the first range, the third fan speed boundary value is the lowest fan speed value of the second range, and the fourth fan speed boundary value is the highest fan speed value of the second range.

* * * * *